J. W. BRONSON.
CULTIVATING IMPLEMENT.
APPLICATION FILED JUNE 21, 1921.

1,424,552.

Patented Aug. 1, 1922.
2 SHEETS—SHEET 1.

Inventor
J. W. Bronson
by Wilkinson & Fiesta
Attorneys.

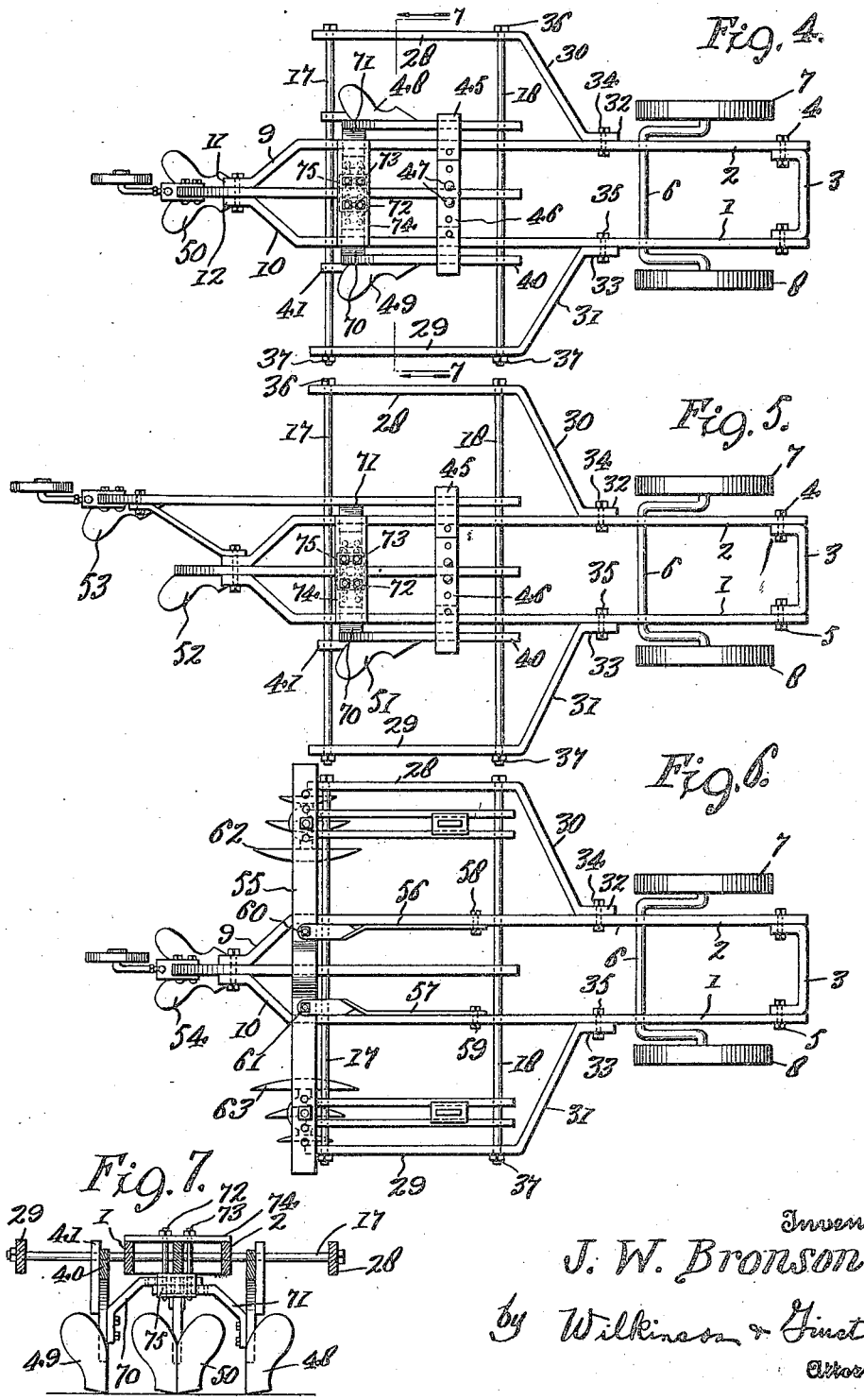

UNITED STATES PATENT OFFICE.

JOHN WILEY BRONSON, OF NEW ORLEANS, LOUISIANA.

CULTIVATING IMPLEMENT.

1,424,552. Specification of Letters Patent. Patented Aug. 1, 1922.

Application filed June 21, 1921. Serial No. 479,334.

*To all whom it may concern:*

Be it known that I, JOHN WILEY BRONSON, a citizen of the United States, residing at New Orleans, in the parish of Orleans and State of Louisiana, have invented certain new and useful Improvements in Cultivating Implements; and I do hereby declare the following to be a full, clear, and exact description of the invention, such as will enable others skilled in the art to which it appertains to make and use the same.

The present invention relates to improvements in tractor attachments, and more specifically stated resides in an improved framework supported upon an adjustable wheeled structure for being dragged after a tractor and having a peculiar novel construction to adapt it to receive and adjustably hold a variety of cultivating implements in several different relative arrangements.

An object of the invention is to provide a simple and compact framework for holding cultivating implements in various dispositions as required at different seasons of the year and for the cultivation of different varieties of vegetation.

Another object of the invention resides in providing an improved framework which is such as to admit of the addition of implements where gangs of the same are required in the cultivation of crops; or the removal of all or a number of these implements as may become necessary for the cultivation of a different character of crop.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a plan view of an improved cultivator attachment for tractors according to the present invention;

Fig. 4 is a similar view with a different arrangement of plows;

Fig. 5 is also a plan view with three plows shown in stepped relation;

Fig. 6 is also a plan view showing the use of colters or disc plows in connection with the invention; and Fig. 7 is a transverse sectional view taken on the line 7—7 in Fig. 4 and on a reduced scale.

Figure 1:
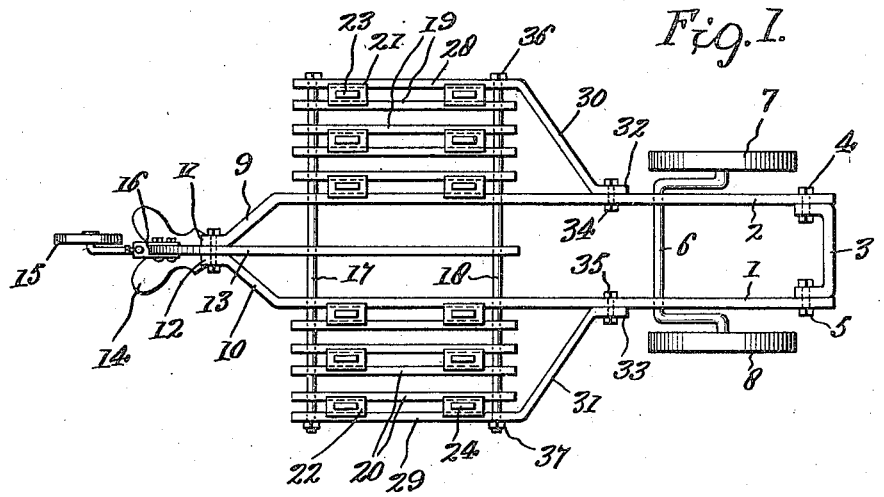

Referring more particularly to the drawings, the improved attachment comprises a pair of beams 1 and 2 which are separated a suitable distance and extend longitudinally of the machine and parallel with the line of draft. A yoke piece 3 having inturned ends is mounted between the beams 1 and 2 at their front portions and secured thereto as by bolts or other fastenings 4 and 5. The beams 1 and 2 at their front portions form suitable bearings in which to journal an arched axle 6 to which the ground wheels 7 and 8 are connected, these wheels forming a power lift in accordance with a well-known practice.

At their rear ends the beams 1 and 2 are bent toward one another to provide convergent diagonal portions 9 and 10 having parallel extremities 11 and 12 bent at an obtuse angle to the convergent portions 9 and 10 and into parallelism with the main body portions of the beams, there being a slight gap left between the extremities 11 and 12 to receive the plow beam 13 which extends forwardly centrally between the beams 1 and 2. The plow beam 13 carries a double moldboard plow or lister 14 suitable for engaging between two rows of plants and for heaping the soil up upon the same as the machine moves through the field. A trailer wheel 15 is carried by the stocks 16 of the plow 14, which stock is in one piece with the beam 13 as is customary, although of course these parts could be as well made in separate pieces.

A pair of rods 17 and 18 are, according to the invention, put through the beams 1 and 2 transversely of the same or at substantially right angles thereto, with the intermediate portions of the rods finding a suitable support in the beams with their outer ends projecting to a suitable extent at opposite sides of the main frame and constituting in effect supplementary frames upon which a variety of implement holders may be appropriately placed. The rods are spaced apart as clearly seen in the drawings in order to form suitably wide supplementary frames to hold pairs of parallel bars 19 and 20 in which sockets 21 and 22 are carried.

Figure 2:
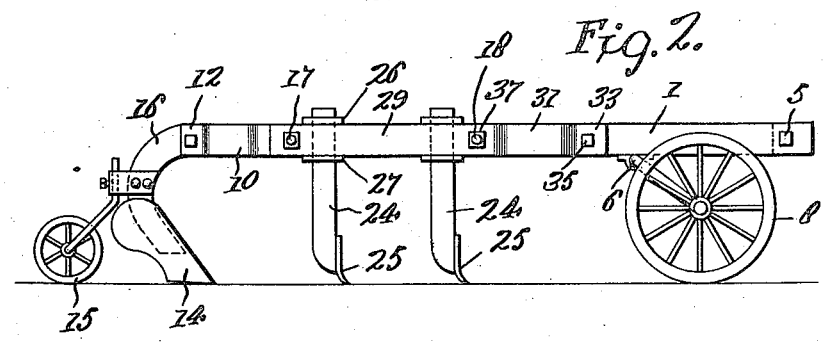
Fig. 2 is a side view thereof.

These sockets are preferably castings in which vertical openings are made to receive the stocks 23 and 24 of shovels or other implements 25. The innermost parallel bars 19 cooperate with the main frame beams 1 and 2, they being spaced therefrom a suitable distance to receive the innermost sockets. These sockets are provided with flanges 26 and 27 as shown most clearly in Fig. 2 respectively above and below the parallel bars in order to prevent any vertical movement on the part of the sockets, but not interfering in any wise with their horizontal movement in a longitudinal direction between such parallel bars.

The stocks 23 and 24 of the shovels 25 are freely adjustable in a vertical direction through the openings made in the sockets so that by reason of this vertical movement of the shovels themselves and the horizontal movement of the sockets, the shovels are enabled to partake of a two-fold adjustment which is both horizontal and vertical and they may thus be adapted and positioned for every variety of plant and cultivation. Furthermore, the parallel bars 19 and 20 may be moved laterally on the rods 17 and 18 to give a further adjustment for the shovels. The outermost parallel bars 28 and 29 are combined with diagonal braces 30 and 31 which extend forwardly and converge in the same direction toward the main frame beams 1 and 2. The extremities 32 and 33 of these braces are turned angularly with respect thereto and into parallelism with the planes of the main beams 1 and 2 against which they are made to lie while being secured as by the bolts 34 and 35.

Figure 3:
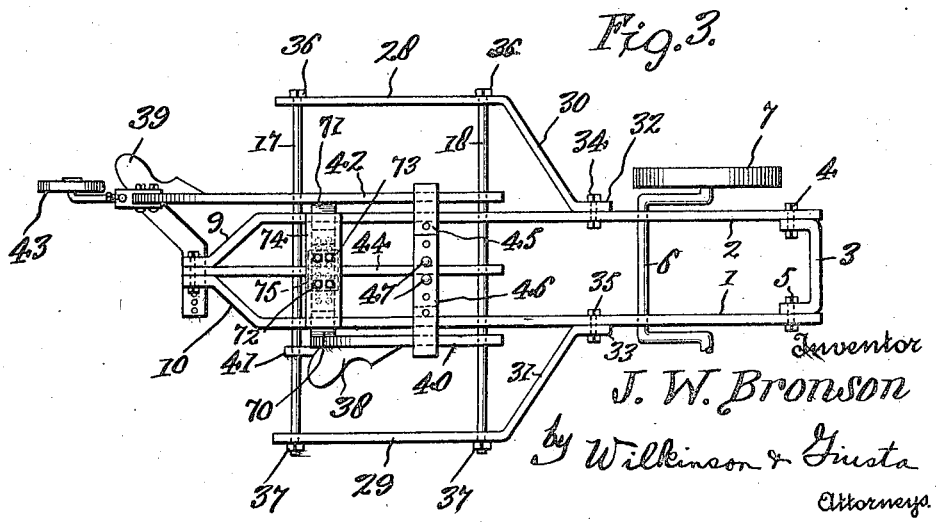
Fig. 3 is a plan view of the same attachment with the shovels removed and twin, offset plows carried thereby.

Heads 36 may be formed on one end of the rods 17 and 18 while the opposite ends are threaded to receive nuts 37. Alternately, both ends of the rods may be screw threaded to receive nuts or other means may be adopted to hold the rods in place and to bind the various parts into strong and durable construction. The rods should, however, be easily withdrawable in order to remove, when desired, the parallel bars. The removal of the parallel bars is clearly shown in Fig. 3 where two single mold board plows 38 and 39 are shown. In this case the moldboards extend in opposite directions and are suitable for heaping the earth up upon opposite sides of different rows of plants and it will be noted that the plows are carried one in advance of the other or on a diagonal line, so that both plows operate independently.

The stock 40 is braced at the rear and beneath the main frames 1 and 2 and center beam 13 suitably bent and adjusted in a lateral direction. The plow 38 is carried by a beam 40 having its forward end slidable laterally upon the rod 18 while an extension piece 41 is connected to the rear end of the plow 38 or to its stock and is made slidable upon the other rod 17. The plow 38 is thus laterally adjustable.

The beam 42 of the other plow 39 is similarly mounted upon both the rods 17 and 18 and is slidable laterally thereon, the plow 39 being the rearmost plow carries the trailer wheel 43. In this instance a center beam 44 is provided to take the place of the beam 13 shown in Fig. 1, the same being connected between the extremities 11 and 12 of the main beam and being engaged with the rods 17 and 18. A pair of adjustable brace plates 45 and 46 having overlapping engagement at their intermediate portions and connected at their outer ends to the beams 40 and 42 are provided, they having suitable perforations to receive one or more bolts 47 by which they are secured together after adjustment.

Referring more particularly to Fig. 4, the improved attachment is shown to be susceptible of receiving three plows in a different arrangement, two of the plows 48 and 49 being in lateral alinement while the third plow 50 extends between and at the rear of the first two mentioned plows. The lateral plows 48 and 49 are single moldboard plows with the moldboards extending at opposite sides, while the rear plow 50 is a double moldboard plow and is adapted to extend into an intermediate row for the purpose of row building, or the arrangement is what is known as a stubble destroyer and is used at the beginning of a crop to tear out the old rows, removing the dirt therefrom and throwing it into the space or middle between the old rows, building up a new row on the ground that was before the change the middle between the rows. The side plows 48 and 49 are in this instance carried in the same manner as the plow 38 shown in Fig. 3 and they are adjustable upon the rods 17 and 18 and are secured by adjustable brace plates in a similar manner.

In Fig. 5 a still further different disposition of plows is shown in which three gang plows extend in a diagonal line. The foremost plow 51 is mounted upon the rods 17 and 18 in a laterally adjustable manner, while the intermediate plow 52 is mounted similarly to the plow shown in Fig. 1, while the third plow 53 carries the trailer wheel and is mounted similarly to the plow 39 shown in Fig. 3. Brace plates 45 and 46 are also mounted in conjunction with these plows. As is well-known in this art this arrangement is suitable for a different character of cultivation.

Where the cultivation requires the use of disc plows, an arrangement such as shown in Fig. 6 can be resorted to with my invention. Here a double moldboard plow 54 with a trailer wheel is carried at the rear center of the implement in a manner which will now be well understood.

A beam 55 extends transversely across and upon the main beams 1 and 2 and slightly beyond the rod 17 and slightly to the rear of the same. This beam 55 is reinforced by braces 56 and 57 which take up the drag, they being secured as by bolts 58 and 59 to the main frame beams 1 and 2 and as by bolts 60 and 61 to the beam 55. The beam 55 carries the disc plows 62 and 63 which are preferably mounted in gangs of three and are suitably held upon the side portions of the beam 55. In this instance certain of the parallel bars 19 and 20 are provided with implement holders 21 and 22 thereon.

As shown in Figs. 3, 4, 5 and 7 a rear brace is also preferably used in connection with the plow beams or stocks, this brace consisting of the brace arms 70 and 71 bent substantially as indicated in Fig. 7 and having their outer ends secured to the stocks of the plows 48 and 49 and with their inner ends overlapping and provided with a number of perforations adapted to be brought into registry to receive the bolts 72 and 73 which pass down on opposite sides of the center beam of the plow 50 and engage through a plate 74 which straddles the beams 1 and 2. The perforations allow of the adjustment of the brace bars 70 and 71 toward or away from each other and permit a lateral adjustment of the plows 48 and 49 along the rods 17 and 18. A clip 75 is preferably fitted about the overlapped ends of the brace bars 70 and 71 to keep them in proper overlapping engagement.

In use, the implements are mounted on the rods 17 and 18 in accordance with any of the modifications shown herein, or in fact in accordance with any other arrangement that may be necessary on account of the character of the cultivation and it will be apparent that the improved framework admits of a great number of combinations of implements. A tractor is attached to the forward portion of the main framework and the machine with the implements attached is drawn through the field, with the plows engaging between the rows.

As the machine progresses through the field the moldboards will heap the soil up upon the plants and will insure a proper cultivating action, operating upon either a single row at a time or a number of rows in accordance with the arrangement and disposition of the plows which is determined in advance.

It will be appreciated from the foregoing that I have provided an exceedingly compact structure for affording great variation in the choice of implements to be used and in the choice of the relative disposition of these implements and that with a machine of this character cultivation may be carried on under various different circumstances with exceedingly effective results.

It is obvious that various changes and modifications may be made in the details of construction and design of the above specifically described embodiment of this invention without departing from the spirit thereof, such changes and modifications being restricted only by the scope of the following claims.

What is claimed is:

1. A cultivating implement comprising a pair of beams extending longitudinally in substantially parallel relation and being situated relatively far apart with their rear ends converging together and secured, means connecting the forward ends of the beams, supporting wheels at the forward portions of the beams, transversely elongated rods extending through the beams in spaced relation, bars adjustably mounted on said rods outwardly of said beams for receiving implements, the outermost bars having diagonal braces at their forward ends secured to said beams substantially as described.

2. A cultivating machine comprising a pair of parallel spaced apart and longitudinally extending beams converging at their rear ends and being secured together, connecting means between the forward ends of said beams, supporting wheels for the forward portions of the beams, a pair of rods passed loosely through the beams in a lateral direction and extending beyond both sides of the beams, end bars substantially parallel with the beams engaging the outer end portions of the rods and having forwardly converging braces secured to the beams, said rods having means thereon to engage the outer sides of said bars to prevent lateral shifting of the rods, and other bars slidable laterally on said rods between the beams and said first mentioned bars and adapted to carry implements substantially as described.

3. A cultivating machine comprising spaced apart beams lying lengthwise of the machine and converging together at their rear ends, a stock for an implement secured between the converging ends and lying forwardly between the beams, a pair of spaced apart rods extending laterally through the beams and said stock and projecting to both sides of the machine, end bars connecting the outer ends of the rods and having forwardly converging braces secured to the sides of the beams, said rods having means on the extremities thereof to engage the outer faces of said end bars, a plurality or intermediate bars mounted slidably on the rods, sockets for implement shanks mounted between adjacent bars and slidable therebetween substantially as described.

JOHN WILEY BRONSON.